US011738645B2

(12) United States Patent
Moon et al.

(10) Patent No.: US 11,738,645 B2
(45) Date of Patent: Aug. 29, 2023

(54) AUDIBLE PASSENGER ANNOUNCEMENTS FOR AUTONOMOUS VEHICLE SERVICES

(71) Applicant: Waymo LLC, Mountain View, CA (US)

(72) Inventors: Maria Moon, Mountain View, CA (US); Julien Charles Mercay, Redwood City, CA (US); Kyle Bechtel, San Mateo, CA (US); Ryan Powell, San Francisco, CA (US); Clement Wright, San Francisco, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/506,912

(22) Filed: Oct. 21, 2021

(65) Prior Publication Data

US 2022/0041057 A1 Feb. 10, 2022

Related U.S. Application Data

(63) Continuation of application No. 17/075,973, filed on Oct. 21, 2020, now Pat. No. 11,180,029, which is a
(Continued)

(51) Int. Cl.
*B60K 35/00* (2006.01)
*G05D 1/00* (2006.01)

(52) U.S. Cl.
CPC ........... *B60K 35/00* (2013.01); *G05D 1/0088* (2013.01); *B60K 2370/1575* (2019.05); *B60K 2370/161* (2019.05); *G05D 2201/0213* (2013.01)

(58) Field of Classification Search
CPC ............ B60K 35/00; B60K 2370/1575; B60K 2370/161; G05D 1/0088; G05D 2201/0213
See application file for complete search history.

(56) References Cited

U.S. PATENT DOCUMENTS 9,436,182 B2 9/2016 Nemec et al.
9,663,117 B2 5/2017 Cullinane et al.
(Continued)

FOREIGN PATENT DOCUMENTS

CN 106004923 A 10/2016
CN 106255933 A 12/2016
(Continued)

OTHER PUBLICATIONS

"The First Chinese Office Action for Application No. 202010330962.9 dated Mar. 5, 2021."
(Continued)

*Primary Examiner* — Hongmin Fan
(74) *Attorney, Agent, or Firm* — Botos Churchill IP Law

(57) ABSTRACT

Aspects of the technology relate to assisting a passenger in an autonomous vehicle without a driver. For instance, after a door of the vehicle is opened, a predetermined period of time may be waited by processors of computing devices of the vehicle. After waiting the predetermined period of time and when the vehicle's door remains open, a set of instructions for closing the vehicle's door may be played by the processors through a speaker of the vehicle. Once the door of the vehicle is closed, an announcement may be played by the processors through the speaker requesting that the passenger press a first button to initiate a ride to a destination. In response to the first button being pressed, the ride to the destination may be initiated by the processors by maneuvering the vehicle autonomously to the destination.

20 Claims, 6 Drawing Sheets

Related U.S. Application Data continuation of application No. 16/395,659, filed on Apr. 26, 2019, now Pat. No. 10,843,566.

(56) References Cited

U.S. PATENT DOCUMENTS

| | | |
|---|---|---|
| 10,106,080 B1 | 10/2018 | Hassani et al. |
| 10,795,355 B2 | 10/2020 | Nemec et al. |
| 2013/0224693 A1 | 8/2013 | Gilling et al. |
| 2015/0338849 A1 | 11/2015 | Nemec et al. |
| 2017/0030137 A1 | 2/2017 | Elie et al. |
| 2017/0147959 A1 | 5/2017 | Sweeney et al. |
| 2017/0193627 A1 | 7/2017 | Urmson et al. |
| 2017/0316696 A1 | 11/2017 | Bartel |
| 2018/0237086 A1 | 8/2018 | Evans |
| 2018/0267531 A1 | 9/2018 | Nemec et al. |
| 2018/0284771 A1 | 10/2018 | Ravichandran et al. |
| 2019/0064814 A1* | 2/2019 | Pandit .................. G08G 1/202 |
| 2019/0066515 A1 | 2/2019 | Dyer et al. |
| 2019/0195644 A1 | 6/2019 | Scheufler et al. |
| 2019/0202479 A1 | 7/2019 | Beauvais |
| 2019/0226863 A1 | 7/2019 | Anastasia et al. |
| 2020/0134338 A1 | 4/2020 | Wang |
| 2020/0302779 A1 | 9/2020 | Dingli |
| 2022/0252409 A1* | 8/2022 | Harrington ........ G01C 21/3492 |

FOREIGN PATENT DOCUMENTS

| | | |
|---|---|---|
| CN | 107393295 A | 11/2017 |
| CN | 107415938 A | 12/2017 |
| CN | 108241371 A | 7/2018 |
| CN | 108474665 A | 8/2018 |
| CN | 109557915 A | 4/2019 |
| CN | 109564519 A | 4/2019 |
| WO | 2015179760 A1 | 11/2015 |
| WO | 2018211583 A1 | 11/2018 |
| WO | 2018044285 A8 | 3/2019 |

OTHER PUBLICATIONS

Office Action from Chinese Application No. 202111245674.4 dated Jun. 1, 2023 (21 pages).

* cited by examiner

AUDIBLE PASSENGER ANNOUNCEMENTS FOR AUTONOMOUS VEHICLE SERVICES

CROSS REFERENCE TO RELATED APPLICATIONS

The present application is a continuation of U.S. patent application Ser. No. 17/075,973, filed Oct. 21, 2020, which is a continuation of U.S. patent application Ser. No. 16/395,659, filed Apr. 26, 2019, now issued as U.S. Pat. No. 10,843,566, the entire disclosures of which are incorporated by reference herein.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Vehicles generally, including autonomous and non-autonomous, may provide occupants with audio and/or visual notifications about the status of the vehicle and in some instances, about the status of objects outside of the vehicle.

BRIEF SUMMARY

One aspect of the disclosure provides a method of assisting a passenger in an autonomous vehicle without a driver. The method includes after a door of the vehicle is opened, waiting, by one or more processors of one or more computing devices of the vehicle, a predetermined period of time; after waiting the predetermined period of time and when the vehicle's door remains open, playing, by the one or more processors, a set of instructions for closing the vehicle's door through a speaker of the vehicle; once the door of the vehicle is closed, playing, by the one or more processors, an announcement through the speaker requesting that the passenger press a first button to initiate a ride to a destination; and in response to the first button being pressed, initiating, by the one or more processors, the ride to the destination by maneuvering the vehicle autonomously to the destination.

In one example, when the door of the vehicle is open, playing through the speaker, information identifying the vehicle to the passenger to enable the passenger to confirm that the passenger is in the passenger's assigned vehicle. In another example, the predetermined period of time corresponds to an amount of time during which a passenger can be expected to enter the vehicle and close the door of the vehicle. In another example, the set of instructions includes asking the passenger to press a second button to close the door twice. In this example, the second button is the first button. In addition or alternatively, the set of instructions identifies the second button from a plurality of buttons. In another example, once the door is closed, playing a second announcement stating the destination in order to enable the passenger to confirm that the passenger is in the passenger's assigned vehicle. In this example, the second announcement further requests that the passenger confirm the destination by pressing a second button. In this example, the second button is the first button. In addition or alternatively, the second announcement is played after the ride to the destination has been initiated. In addition or alternatively, the method also includes, before playing the second announcement, confirming that the passenger is seated within the vehicle. In another example, the method also includes, during the ride, providing instructions to the passenger about how to control one or more functions of the vehicle via the speaker. In this example, the one or more functions include opening or closing a window of the vehicle. In addition or alternatively, the one or more functions includes how to use air conditioning of the vehicle. In addition or alternatively, the one or more functions includes how to listen to music. In another example, the method also includes, during the ride, providing a monologue including a plurality of announcements to the passenger about what the vehicle is doing via the speaker; receiving from a user input device, user input requesting a change to a frequency of the plurality of announcements; and changing the frequency based on the request. In another example, the method also includes during the ride, providing a monologue including a plurality of announcements to the passenger about what the vehicle is doing via the speaker; receiving from a user input device, user input requesting a change to a volume of the plurality of announcements; and changing the volume based on the request. In another example, the method also includes, during the ride, providing a monologue including a plurality of announcements to the passenger about what the vehicle is doing via the speaker; receiving from a user input device, user input requesting a change to a content of the plurality of announcements; and changing the content based on the request. In another example, the method also includes, during the ride, providing a monologue including a plurality of announcements to the passenger about what the vehicle is doing via the speaker; identifying a problem condition; providing a second announcement based on the identified problem condition; connecting the vehicle with a rider support representative; and while the rider support representative is connected, disabling at least some of the plurality of announcements. In another example, the method also includes, during the ride, disabling or ignoring inputs from a touch-sensitive display of the vehicle.

DETAILED DESCRIPTION

Overview

Figure 1:
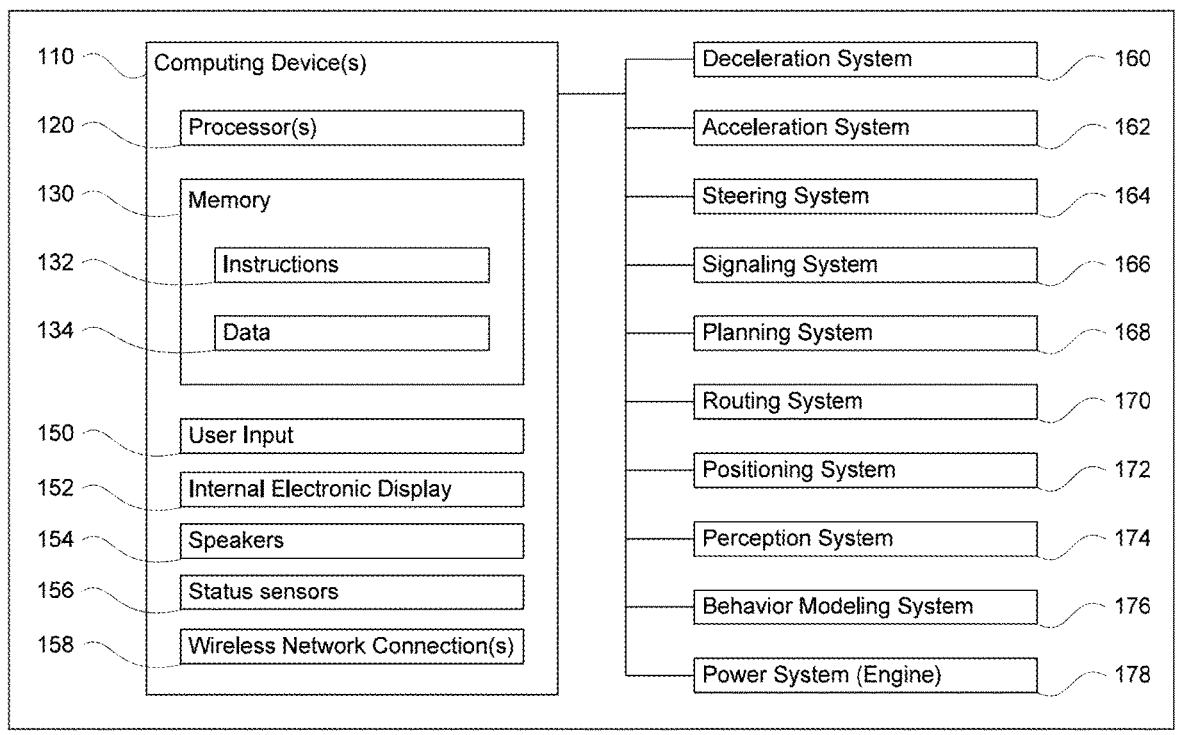
FIG. 1 is a functional diagram of an example vehicle in accordance with an exemplary embodiment.

The technology relates to assisting passengers in vehicles without drivers (i.e. autonomous vehicles). This assistance may include providing audible information to passengers. Passengers who may benefit from such assistance may include those who are blind or have vision impairments, are new to autonomous vehicles (i.e. a first ride), have physical impairments, are elderly or infirm, are distracted or easily distracted, etc. or in situations in which the information to be provided may be too complex or simply too much for presenting visually. By assisting passengers in this way, the passenger may be able to remain calm and more easily understand what the vehicle is doing as well as what the passenger should be doing, for instance, in order to get the vehicle to proceed to the passenger's destination. This in turn, may enable the vehicle to operate more efficiently as discussed further below.

For instance, when a vehicle is stopped to pick up a passenger, the vehicle's computing devices and/or the passenger may open the vehicle's door. At this point, assuming the passenger is getting into or close to the vehicle, the vehicle's computing devices may play some identifying information through a speaker, such as information that may enable the passenger to confirm that he or she is in the correct vehicle.

After a predetermined period of time, if the vehicle's door remains open, for instance as confirmed by feedback from a door sensor, the vehicle's computing devices may play a set of instructions for closing the vehicle's door through the speaker. The predetermined period of time may be a reasonable amount of time during which a passenger can be expected to enter the vehicle and close the door.

Once the door is closed, the vehicle may confirm the passenger's destination. This may include playing an announcement stating the destination, such as a proper name for the destination and/or a street address. The passenger may then be asked to confirm the destination by way of an announcement. After confirming the destination, the passenger may be asked to initiate the ride by way of an announcement. By making this a separate step from confirming the destination, this again may address situations in which a passenger has accidentally confirmed an incorrect destination.

During the ride, the vehicle's computing devices may provide a monologue of information about the ride through the speaker. The announcements may also provide messages about problem conditions of the vehicle, such as problems with the vehicle such as a collision or sensor problems.

As the vehicle approaches the destination, the announcements may also include information related to the destination. For instance, the vehicle's computing devices may use information about an expected arrival time combined with data from other sources to provide information to a passenger or passengers. The announcements may also include information to help orient the passenger or passengers relative to the destination. In some instances, the announcements may identify the current weather situation or whether the passenger would need to avoid any obstacles that are outside of the vehicle. These obstacles and weather conditions may be determined, for instance, based on sensor data from the vehicle's perception system.

In some instances, the passenger or passengers may be able to change the frequency or level of detail of the announcements. For example, a passenger may request more detail on the vehicle's current environment by selecting for the vehicle to play information regarding nearby landmarks or information such as whether the vehicle is at a stop light, what streets the vehicle is passing, etc. As another example, the level of detail for announcements may include two or more levels of detail which the passenger or passengers may select.

The features described herein may allow for a vehicle without a driver to provide assistance to passengers. Again, by assisting passengers in this way, the passenger may be able to remain calm and more easily understand what the vehicle is doing as well as what the passenger should be doing, for instance, in order to get the vehicle to proceed to the passenger's destination. This in turn, may enable the vehicle to operate more efficiently as the passenger will have a better understanding of how to operate the vehicle. For instance, visually impaired users may gain a better understanding of their world and community. Put another way, with human drivers, a visually impaired person may not be provided with sufficient context to allow a visually impaired person the ability to discover new locations by driving through such locations. However, the announcements can create "an audio picture" for visually impaired passengers so they have a much greater context for where they are and what is around them.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "software," "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processors 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user inputs 150 (e.g., a mouse, keyboard, touch screen, buttons, and/or microphone) and various electronic displays (e.g., a monitor having a screen or any other electrical device that is operable to display information). In this example, the vehicle includes an internal electronic display 152 as well as one or more speakers 154 to provide information or audio-visual experiences. In this regard, internal electronic display 152 may be located within a cabin of vehicle 100 and may be used by computing devices 110 to provide information to passengers within the vehicle 100. The computing devices 110 may also include and/or receive feedback from various status sensors 156 of the vehicle which may include, for instance, a door sensor that may indicate to the computing devices 110 the status (i.e. whether open or closed) of a vehicle door (such as vehicle doors 350, 352 of FIG. 2). Other sensors, such as seat belt sensors, seat sensors (e.g. pressure sensors or switches), internal cameras, etc. may also be part of and/or provide feedback to the computing devices 110 about the status of the vehicle 100.

Computing devices 110 may also include one or more wireless network connections 158 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may be capable of communicating with various components of the vehicle in order to control the movement of vehicle 100 according to the autonomous vehicle control software of memory 130 as discussed further below. For example, returning to FIG. 1, computing devices 110 may be in communication with various systems of vehicle 100, such as deceleration system 160, acceleration system 162, steering system 164, signaling system 166, planning system 168, routing system 170, positioning system 172, perception system 174, behavior modeling system 176, and power system 178 (i.e. the vehicle's engine or motor) in order to control the movement, speed, etc. of vehicle 100 in accordance with the instructions 132 of memory 130. Each of these systems may include various hardware (processors and memory similar to processors 120 and memory 130) as well as software, in order to enable these systems to perform various tasks. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Planning system 168 may be used by computing devices 110 in order to determine and follow a route generated by a routing system 170 to a location. For instance, the routing system 170 may use map information to determine a route from a current location of the vehicle to a destination location. The planning system 168 may periodically generate trajectories, or short-term plans for controlling the vehicle for some period of time into the future, in order to follow the route to the destination. In this regard, the planning system 168, routing system 170, and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Although the map information is depicted herein as an image-based map, the map information need not be entirely image based (for example, raster). For example, the map information may include one or more road graphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a road graph to allow for efficient lookup of certain road graph features.

Positioning system 172 may be used by computing devices 110 in order to determine the vehicle's relative or absolute position on a map or on the earth. For example, the position system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 172 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 2:
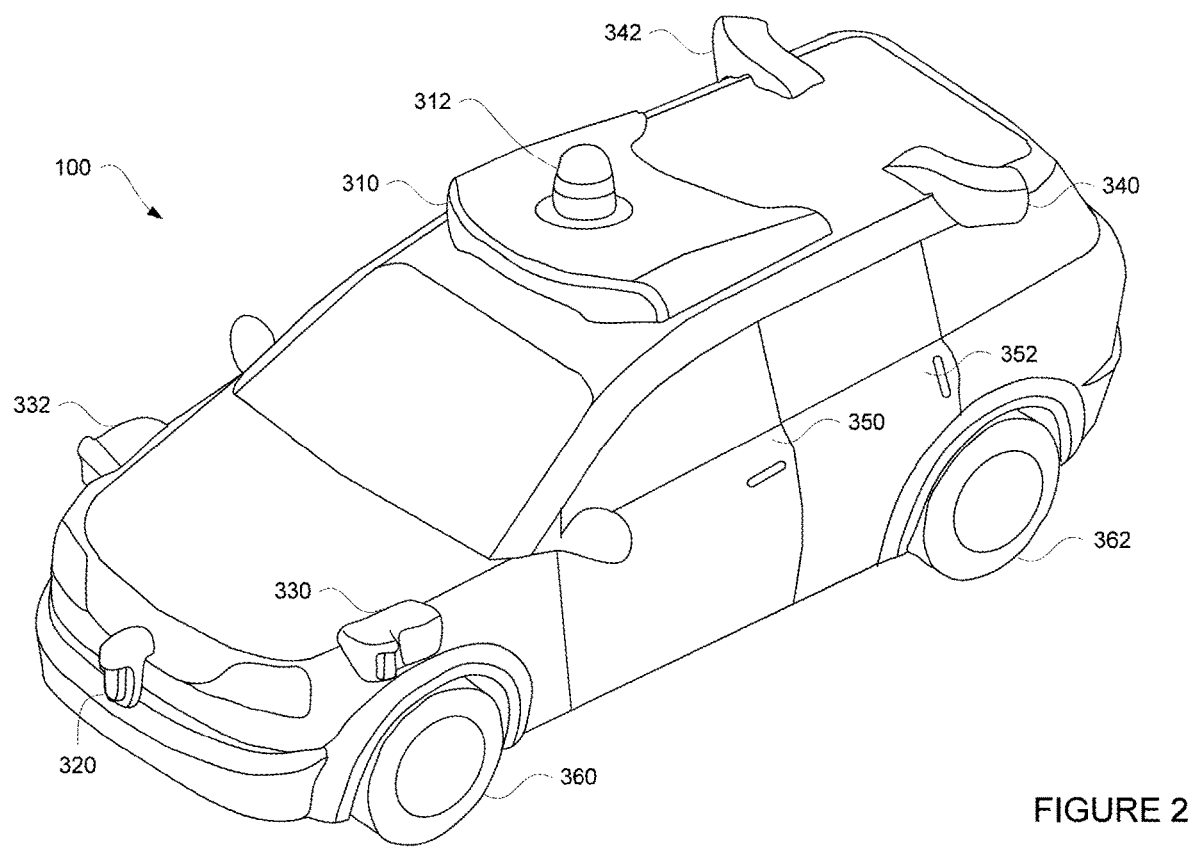
FIG. 2 is an example external view of a vehicle in accordance with aspects of the disclosure.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 2 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 350. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310. Vehicle 100 also includes many features of a typical passenger vehicle such as doors 350, 352, wheels 360, 362, etc.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module which uses various models based on object type to output a predicted future behavior for a detected object. In other instances, the characteristics may be put into one or more detection system software modules, such as a construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 172 identifying the location and orientation of the vehicle, a destination for the vehicle as well as feedback from various other systems of the vehicle (including a route generated by the routing system 170) may be input into a planning system software module of the planning system 168. The planning system may use this input to generate trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing devices 110 may control the direction and speed of the vehicle autonomously by controlling various components. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

In addition, memory 130 may store information that can be used by computing devices 110 to generate and play various announcements through the speakers 154. These announcements may be pre-recorded or dynamically generated voice-over announcements which may provide instructions or other information to a passenger of the vehicle as discussed further below. Pre-recorded or dynamically generated voice-over announcements may be generated in a passenger's selected language and/or in accordance with the passenger's selection of accent/voice type. These selections may be made, for instance, via an application for the autonomous vehicle service discussed further below. The announcements may be stored in any compressed (lossless or lossy) or uncompressed audio file formats. Announcements may include individual sound files which may be played together with other sounds files in order to provide information to passengers of the vehicle 100. In addition, each of these announcements may be associated with or otherwise indexed to an event or a series of events. In this regard, identifiers for a particular event or series of events may be used to identify an appropriate announcement or announcements.

Figure 3:
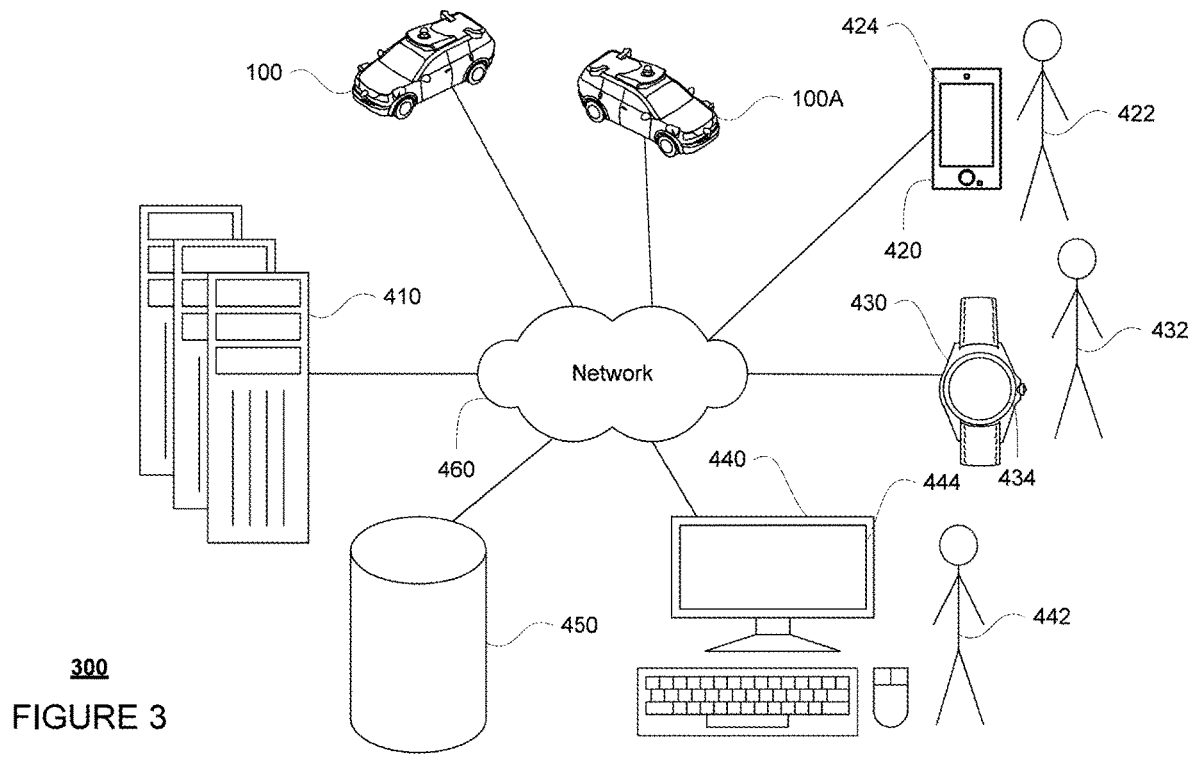
FIG. 3 is a pictorial diagram of an example system in accordance with aspects of the disclosure.
Figure 4:
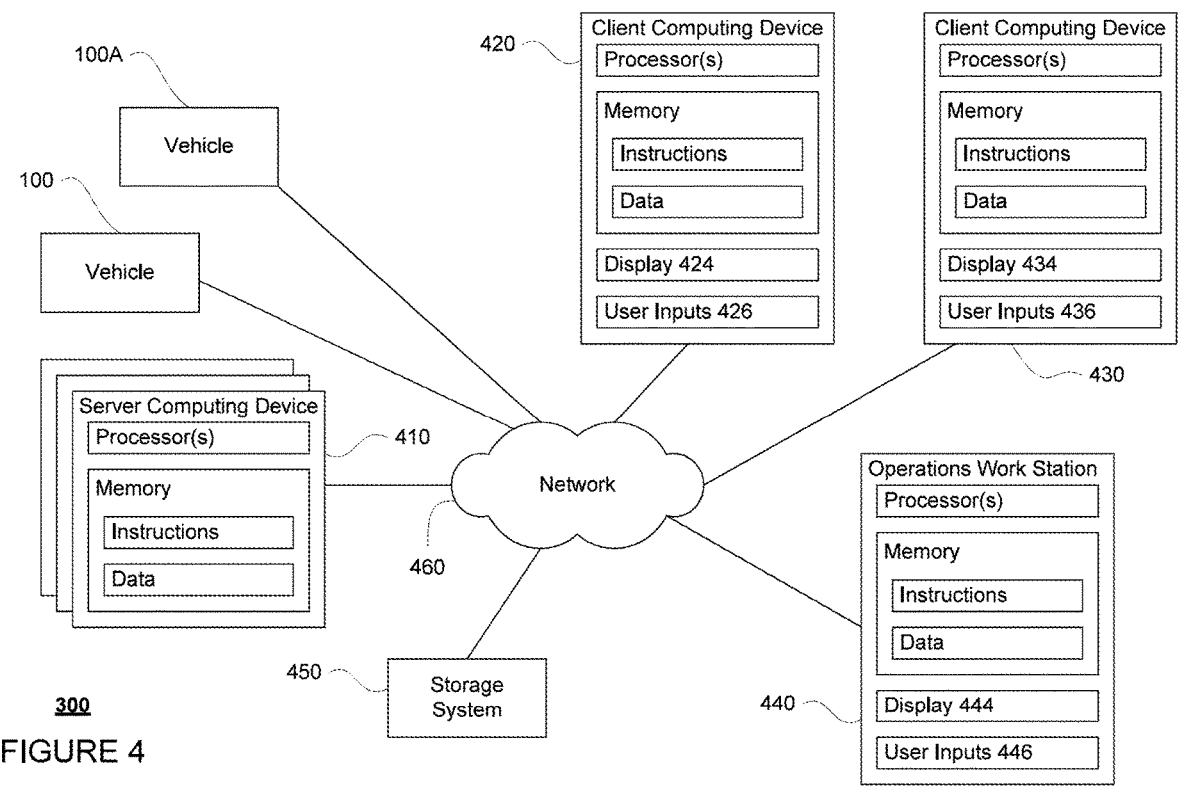
FIG. 4 is a functional diagram of the system of FIG. 3 in accordance with aspects of the disclosure.

Computing device 110 of vehicle 100 may also receive or transfer information to and from other computing devices, such as those computing devices that are a part of the transportation service as well as other computing devices. FIGS. 3 and 4 are pictorial and functional diagrams, respectively, of an example system 300 that includes a plurality of computing devices 410, 420, 430, 440 and a storage system 450 connected via a network 460. System 300 also includes vehicle 100 and vehicles 100A, which may be configured the same as or similarly to vehicle 100. Although only a few vehicles and computing devices are depicted for simplicity, a typical system may include significantly more.

As shown in FIG. 3, each of computing devices 410, 420, 430, 440 may include one or more processors, memory, data and instructions. Such processors, memories, data and instructions may be configured similarly to one or more processors 120, memory 130, data 134, and instructions 132 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system which can be used to dispatch vehicles such as vehicle 100 and vehicle 100A to different locations in order to pick up and drop off passengers. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 3. As an example, the user may input information using a small keyboard, a keypad, microphone, using visual signals with a camera, or a touch screen.

In some examples, client computing device 440 may be concierge work station used by an administrator to provide concierge or remote assistance services to users such as users 422 and 432. For example, a representative 442 may use the concierge work station 440 to communicate via a telephone call or audio connection with users through their respective client computing devices or vehicles 100 or 100A in order to ensure the safe operation of vehicles 100 and 100A and the safety of the users as described in further detail below. Although only a single concierge work station 440 is shown in FIGS. 3 and 4, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 3 and 4, and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 5:
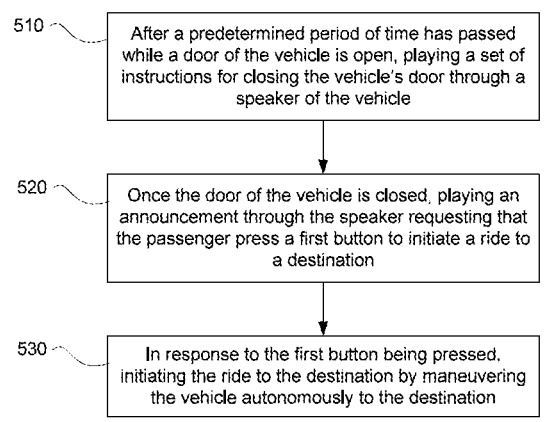
FIG. 5 is an example flow diagram in accordance with aspects of the disclosure.

FIG. 5 is an example flow diagram 500 of aspects of the technology described herein for assisting a passenger in an autonomous vehicle without a driver, such as vehicle 100, which may be performed by one or more processors of one or more computing devices of the vehicle, such as processors 120 of computing devices 110. For instance, at block 510, after a pre-determined period of time has passed while a door of the vehicle is opened, a set of instructions for closing the vehicle's door are played through a speaker of the vehicle. For instance, the vehicle's computing devices may wait a predetermined period of time for the vehicle's door to be closed. If after waiting the predetermined period of time, the vehicle's door remains open, the computing devices 110 may play a set of instructions for closing the vehicle's door through a speaker of the vehicle. At block 520, once the door of the vehicle is closed, an announcement is played through the speaker requesting that the passenger press a first button to initiate a ride to a destination. At block 530, in response to the first button being pressed, the ride to the destination is initiated by maneuvering the vehicle autonomously to the destination.

In order to generate and provide announcements, the computing devices 110 may determine when certain events occur. As discussed further below, events may be identified based on the status of a trip (picking up a passenger, relative location on a route to a destination, etc.), feedback from various sensors of the vehicle, and/or monitoring messages sent to and from various system of the vehicle. For instance, the monitoring may include reviewing messages and the content of those messages sent to and from the various systems of the vehicle. For example, instructions provided by the planner system 168 to the acceleration and deceleration systems, messages from the perception system 174 to the planner system 168, feedback from various sensors of the vehicle (e.g., a door sensor, light sensor, cameras, seat belt sensors, pressure sensors), etc. may correspond to particular events. As another example, messages provided by the perception system 174 may correspond to events when the perception system detects traffic lights, stop signs, emergency vehicles or other uncommon events. In other instances, when the location of the vehicle is proximate to locations in the map information associated with a particular flag or certain types of data, this may correspond to an event. For instance, the computing devices 110 may determine when the vehicle is nearby a location of the map information associated with a flag for a newly opened business, this may correspond to an event. Once an event or series of events are determined to have occurred, the computing devices 110 may, for instance use the identifiers for the event or series of events, to retrieve and play a corresponding announcement from the memory. Other examples are included below.

Other types of information may be used by the computing devices 110 in order to increase or decrease the frequency of announcements. For instance, the current time of day may be used to customize the frequency, content, or volume of messages. For example, quieter, less verbose, less frequent announcements may be more appropriate late at night, while louder, more verbose, more frequent announcements may be more appropriate during the day.

In one aspect, a user may download an application for requesting a vehicle to a client computing device. For example, users 422 and 432 may download the application via a link in an email, directly from a website, or an application store to client computing devices 420 and 430. For example, client computing device may transmit a request for the application over the network, for example, to one or more server computing devices 110, and in response, receive the application. The application may be installed locally at the client computing device.

The user may then use his or her client computing device to access the application and request a vehicle. As an example, a user such as user 432 may use client computing device 130 to send a request to one or more server computing devices 110 for a vehicle. As part of this, the user may identify a pickup location, a destination location, and, in some cases, one or more intermediate stopping locations anywhere within a service area where a vehicle can stop.

Once the user has selected one or more of a pickup and/or destination locations, the client computing device 420 may send the location or locations to one or more server computing devices of the centralized dispatching system. In response, one or more server computing devices, such as server computing device 110, may select a vehicle, for instance based on availability and proximity to the user. The server computing device may then dispatch the selected vehicle to pick up to the user by providing the vehicle with the pickup and/or destination locations specified by the user.

Upon receipt of this information, the computing devices 110 may control the vehicle in order to pick up the user, referred to hereafter as a passenger. Once the vehicle is within a predetermined distance of the pickup location or some other threshold is met, the computing devices 110 may begin to identify areas proximate to the pickup location at which the vehicle may stop and wait for the passenger. Once an area is identified, the computing devices 110 may use the various systems of vehicle 100 to control the vehicle in order to stop the vehicle in the identified area and wait for the passenger.

When a vehicle is stopped to pick up a passenger, the computing devices 110 and/or the passenger may open a door of the vehicle, for instance, such as door 350 or door 352. At this point, assuming the passenger is getting into or close to the vehicle, this may correspond to an event as described above. Accordingly, the computing devices 110 may play an announcement including some identifying information through a speaker, such as one of speakers 154. This identifying information may include the passenger's name or other information such as a specially chosen phrase or description (e.g. "blue diamond") which will enable the passenger to confirm that he or she has entered the correct, or in other words, his or her assigned vehicle.

After the door of the vehicle is opened, the computing devices 110 may wait a predetermined period of time. The predetermined period of time may be a reasonable amount of time during which a passenger can be expected to enter the vehicle 100 and close the door, such as 10 seconds or more or less. After waiting the predetermined period of time, the computing devices 110 may determine whether the door is still open, for instance, via feedback from a door sensor.

After waiting the predetermined period of time and when the vehicle's door remains open, the computing devices 110, this may trigger an event as described above. Accordingly, the computing devices 110 may play an announcement of the memory 130 that includes a set of instructions for closing the vehicle's door. As noted above, this announcement may be identified based on the occurrence of a series of events, such as the vehicle stopping, waiting the period of time, and the door remaining open, are determined to have occurred. The computing devices 110 may play the announcement through the speaker, such as one of speakers 154. As one instance, the set of instructions may include asking the passenger to press a particular button on a set of buttons, for instance of user input 150, twice. For example, if there are multiple buttons, the passenger may be asked via the announcement to press a "rightmost button" twice. In this example, by asking the passenger to press the button twice, this may prevent an accidental closing of the vehicle door before the passenger is completely within the vehicle. In addition, by providing the instructions as "a rightmost button" in a row of buttons, persons who are visually impaired or are unable to read or understand icons may more readily find the button.

Once the door is closed, for instance as confirmed by feedback from the door sensor, this may trigger an event as described above. The announcement for this event may include the computing devices 110 may confirming the passenger's destination. As noted above, this announcement may be identified based on the occurrence of a series of events, such as the vehicle stopping, the door opening and thereafter the door being closed, are determined to have occurred. The computing devices 110 may thus play the announcement via the speakers 154, including information identifying the passenger's (or rather, the vehicle's) destination, such as a proper name for the destination and/or a street address. The passenger may then be asked by way of the announcement to confirm the destination, for instance, by way of a user input. For example, this may include instructing the passenger to press the same or a different button of the user inputs 150 via the announcement. In response to the passenger pressing the same or a different button, the vehicle's computing devices may understand the destination to be confirmed.

In some instances, before confirming the destination via playing the announcement and requesting the passenger to provide some input, the computing devices 110 may first confirm that the passenger or passengers are seated within the vehicle. Again, this may be an event that the computing devices 110 may need to confirm before identifying the announcement from memory 130 for confirming the destination. Whether a passenger is seated may be confirmed, for instance, using seat belt sensors, seat sensors (e.g. pressure sensors or switches), internal cameras (for instance, with a connection to a rider support representative who confirm or using machine vision to detect a person sitting in the correct location), etc.

Once the door of the vehicle is closed, this may trigger an event as described above. Accordingly, the computing devices 110 may play an announcement through the speaker 154 requesting that the passenger press a first button to initiate a ride to a destination. As noted above, this announcement may be identified based on the occurrence of a series of events, such as the vehicle stopping, the door opening and thereafter the door being closed, and/or the passenger confirming the destination are determined to have occurred by the computing devices 110. For instance, the computing devices 110 may identify and play an announcement of memory 130 requesting that the passenger press the same (e.g. the rightmost button) or a different button of the user inputs 150. in response to the first button being pressed, initiating, by the one or more processors, the ride to the destination by maneuvering the vehicle autonomously to the destination. In response to the passenger pressing the same or a different button, the computing devices 110 may initiate the trip to the destination by maneuvering the vehicle autonomously to the destination. Of course, the announcement may be skipped in situations in which the passenger has already initiated the trip by pressing the button. By making this a separate step from confirming the destination, this again may address situations in which a passenger has accidentally confirmed an incorrect destination.

Alternatively, the computing devices may play an announcement asking the passenger to confirm the destination only after the ride has been initiated. In other words, after the vehicle has already begun maneuvering towards the destination. As noted above, this announcement may be identified based on the occurrence of a series of events, such as the vehicle stopping, the door opening and thereafter the door being closed, and the ride has been initiated are determined to have occurred by the computing devices 110. This may be most practical and useful in situations in which the vehicle is in a loading zone, high traffic area, or is otherwise unable to stop for longer periods of time.

Figure 6:
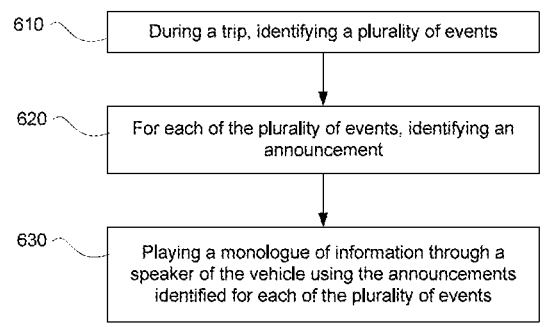
FIG. 6 is an example flow diagram in accordance with aspects of the disclosure.

FIG. 6 is an example flow diagram 600 of aspects of the technology described herein for assisting a passenger in an autonomous vehicle without a driver, such as vehicle 100, which may be performed by one or more processors of one or more computing devices of the vehicle, such as processors 120 of computing devices 110. For instance, at block 610, during a trip, a plurality of events are identified. At block 620, for each of the plurality of events, an announcement is identified. At block 630, a monologue of information is played through a speaker of the vehicle using the announcements identified for each of the plurality of events. As discussed in further detail below, this monologue of information may include information about what is being displayed to the passenger during the ride (e.g. what is happening), problem conditions for the vehicle, the status of the ride (e.g. relative to the destination), events taking place or that will take place at a location outside of the vehicle, weather conditions, etc.

For instance, during the ride, the computing devices 110 may provide a monologue of information about the ride through the speaker, such as one of speakers 154. This monologue may include a series of announcements triggered based on various events that occur during the ride. This may include providing announcements about what is displayed on an internal display of the vehicle such as whether the vehicle is stopped and why (e.g. "waiting for pedestrians" or "waiting for cyclists" or "waiting for redlight"), whether the vehicle has made a hard brake (e.g. a quick deceleration) and why (e.g. "yielding to pedestrian"), etc. These announcements may also include information about estimated time of arrival changes, progress reports (e.g. "we are halfway through the ride"), routing issues (e.g. "there is construction ahead so we are taking a detour"), and destination changes. In some instance, the announcements may be more instructional in nature, such as how to use the air conditioning, open or close the windows, use the radio or listen to music, etc.

In other instances, the announcements may request the passenger to provide a response by pressing a button, using a touchscreen, or an audible command. For instance, the announcements may ask the passenger if he or she needs to change a destination, make a phone or video call, needs medical or other assistance, or hear a joke. For example, after a harsh brake event, an announcement may ask the passenger, "Are you okay?" and depending on the rider's answer, could trigger a responsive announcement such as "should we continue?", "would you like to speak to a rider support representative" or "should we go to the nearest emergency room?" These announcements may be identified from the memory 130 based on the messages monitored by the computing devices 110.

In certain situations, the computing devices 110 may provide also provide announcements that include information about problem conditions of the vehicle, such as a collision or sensor problems which may correspond to events. These announcements may be identified from the memory 130 based on the messages monitored by the computing devices 110. These announcements may be intentionally vague, such as "we have noticed a problem and are connecting you with a rider support representative," in order to limit unnecessary concern on the part of the passenger. In such situations, the rider support representative may be able to communicate with the passenger or passengers via the speaker, such as one of speakers 154, or another speaker and/or a video connection. When connected to a rider support representative, the vehicle's computing devices may stop, mute or lower the volume for the announcements so that the passenger or passengers can more clearly communicate with the rider support representative. Alternatively, certain announcements which the rider support representative is unable to provide may still be played through the speaker while other announcements may be stopped, muted, or played at a lower volume.

In some instances, the user inputs 150 may include a button for enabling the passenger or passengers to request that the vehicle pull over. When this button is pressed, the computing devices 110 may provide an announcement confirming the pull over has been requested, that the passenger can cancel the request by pressing the button a second time, and that the vehicle is looking for a place to pull over. Similarly, if a passenger presses the pull over button a second time, the computing devices 110 may provide an announcement confirming that the pull over has been cancelled.

As the vehicle approaches the destination, the computing devices may determine that various events are occurring. The announcements for such events may also include information related to the destination. For instance, the computing devices 110 may use information about an expected arrival time combined with data from other sources to provide information to a passenger or passengers. As an example, if the computing devices 110 determine that the arrival at a point of interest corresponding to the destination will be outside of operating hours, the computing devices may provide an announcement asking the passenger to confirm a desire to continue the destination or changing destinations. As another instance, the announcements may identify that the vehicle is proximate to the destination, remind passengers to collect their personal items, etc. The announcements may also include information to help orient the passenger or passengers relative to the destination such as how to reach the destination from the location of the vehicle (e.g. exit passenger door and walk to the left), which side of the street relative to the destination the vehicle is located, which direction to walk to cross the street safely, the closest cross streets, the names of businesses adjacent to the vehicle, etc. The announcements may also identify whether the vehicle is stopped at a curb or in the middle of a parking lot, which may be especially useful to visually impaired passengers. The announcements may even ask the passenger to press a particular button or respond audibly if the passenger needs additional assistance in order to connect a rider support representative. In some instances, the announcements may identify the current weather situation, for instance "it is currently raining" or "it is currently snowing." In addition, or alternatively, the announcements may also identify whether the passenger would need to avoid any obstacles that are outside of the vehicle such as a tree, curb, bush, bicyclist, puddle, etc. These obstacles and weather conditions may be determined, for instance, based on sensor data from the vehicle's perception system.

As indicated above, in some instances, events may be triggered by the geographic location of the vehicle 100. For instance, as the vehicle passes through a certain location, the computing devices 110 may provide announcements including information about that particular area. This may provide passengers with the experience of a guided tour provided by the computing devices. Such announcements may be especially useful and interesting when the vehicle is located, in areas where key points of interest may have historical or social significance.

In addition to providing information about weather conditions at the destination, changes in weather conditions may also correspond to events leading the computing devices 110 to provide announcements. For instance, announcements may be identified from the memory 130 based on information received from a remote computing device, such as the server computing devices 410, or may be determined, for instance, based on sensor data from the vehicle's perception system. As an example, if rain or other precipitation is predicted or detected, an announcement may be played to indicate this information. The content of the announcement may change depending on the where the vehicle is related to the pickup and destination location. For instance, if near the pickup location (right after the passenger has boarded), an announcement may include, "Hi, passenger—glad to get you out of the rain" or if near the destination location, an announcement may include, "Hope you catch a rainbow!" As another example, the announcements may be related to temperature, such as "Hope you enjoy the air conditioning on your ride!" near the pickup location or "Hope you stay warm and thanks for riding!" if near the destination location.

In some instances, in addition to the language and/or accent used, the tone of announcements may be selected from a plurality of different tones of the memory 130. For instance, if the passenger were going to a special event, that there might be different ways the announcements might sound to make the trip part of the journey of the destination. For example, the tone may be different if the vehicle was headed to an amusement park, for instance by using character voices or park-related themes in the announcements or words, versus a baseball game, for instance by using baseball related themes or words in the announcements. In some instances, a passenger may be able to change the tone or "personality" in which the announcements are spoken. For instance, a passenger may choose a particular celebrity's voice, male or female voice, and/or language of the announcements.

In some instances, the passenger or passengers may be able to change the frequency or level of detail of the announcements. For instance, the passenger or passengers may be able to use his or her client computing device, such as client computing devices 420, 430, an internal display of the vehicle such as internal display 152, or a voice command (received by the vehicle's computing devices via a microphone of the user inputs 150) to request more or less announcements and/or more or less information. A passenger may even turn off the announcements completely or request that the vehicle's computing devices not provide similar types of messages in the future or to provide more detail for these types of messages in the future such as: announcing each street name ("Now proceeding on Main Street"), announcing each turn ("Turning left onto Bridge Street"), announcing each traffic signal ("Stopping for a red light"), announcing city boundaries ("Welcome to Mountain View"), etc. Alternatively, rather than individual controls, these may be placed into buckets like "location-based notifications (street names, turn, cities)" and "situation notifications (traffic lights, pedestrians, traffic, etc)" or "trip notifications" (remaining time, ETA, percentage complete)

For example, a passenger may request more detail on the vehicle's current environment by selecting for the vehicle to play information regarding nearby landmarks (e.g. a "tour" of the area through which the vehicle is driving or about the drive, describing billboards or other outdoor advertising or signs of which the user would not normally be unaware, e.g. "There is a sign ahead advertising for the Mountain View Community Festival June 1st to 3rd", or information about local business offerings such as sponsored content, etc.) or information such as whether the vehicle is at a stop light, what streets the vehicle is passing, etc. In this regard, as noted above, announcements may be triggered by the geographic location of the vehicle 100, and may be especially useful and interesting when the vehicle is located, in areas where key points of interest may have historical or social significance.

As another example, the level of detail for announcements may include two or more levels of detail which the passenger or passengers may select. In addition, in some instances, when the announcements are on (or at least minimally on), the vehicle's computing devices may disable or ignore feedback from any touch-sensitive displays or other inputs of the user inputs 150, in order to prevent a visually impaired person from accidentally bumping the inputs and entering incorrect information.

The announcements may also be based on a passenger's interests, for instance, which may be defined in the passenger's account profile or provided via speaking this information while in the vehicle. If the passenger indicated that they were interested in music, the vehicle's computing devices could play announcements like "We are passing the local concert hall", "We are passing a record store on the left", or even time-based events like "We are passing Central Park where there will be a free concert tomorrow at 2 pm."

In some instances, the vehicle's computing devices may determine the ambient noise levels within the vehicle 100. If the ambient noise levels would indicate that one or more passengers in the vehicle are talking, the vehicle's computing devices may also stop, mute or lower the volume for the announcements. However, in certain situations, such as a collision or a sensor failure, these announcements may be played at a louder volume.

The passenger or passengers may also select to allow the computing devices 110 to provide announcements unrelated to the current ride. For instance, the computing devices 110 may provide announcements using information from a calendar of the passenger (i.e. an itinerary for the day). In this regard, the announcement may even be based on the current ride (e.g. "After we drop you off at your destination, you will have 3 hours and 15 minutes until your next appointment"). As another instance, the computing devices 110 may enable the passenger or passengers to schedule additional rides.

As an alternative to the above "push" mechanism where the computing devices 110 initiate announcements based on events separate from the passenger or passengers, "pull" mechanism may also be helpful. For instance, a passenger may press a button or speak to ask a question such as "What's happening right now?" The vehicle's computing devices may then respond with an announcement that provides details about the current situation based on the state of the vehicle 100 and the vehicle's surroundings. For example, one such announcement may include "We are moving slowly due to rain and traffic on the road."

The features described herein may allow for a vehicle without a driver to provide assistance to passengers. Again, by assisting passengers in this way, the passenger may be able to remain calm and more easily understand what the vehicle 100 is doing as well as what the passenger should be doing, for instance, in order to get the vehicle to proceed to the passenger's destination. This in turn, may enable the vehicle 100 to operate more efficiently as the passenger will have a better understanding of how to operate the vehicle. For instance, visually impaired users may gain a better understanding of their world and community. Put another way, with human drivers, a visually impaired person may not be provided with sufficient context to allow a visually impaired person the ability to discover new locations by driving through such locations. However, the announcements can create "an audio picture" for visually impaired passengers so they have a much greater context for where they are and what is around them.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of operating an autonomous vehicle assigned to a passenger without a driver, the method comprising:
controlling, by one or more processors, the vehicle to pick up the passenger and transport the passenger towards a first location;
while the vehicle is transporting the passenger towards the first location, receiving, by the one or more processors, a first user input from the passenger requesting that the vehicle pull over before the vehicle reaches the first location;
in response to receiving the first user input:
playing, by the one or more processors, a first announcement through a speaker of the vehicle confirming that a request for the pull over has been made;
looking, by the one or more processors, for a second location to pull over; and
controlling, by the one or more processors, the vehicle to pull over at the second location.

2. The method of claim 1, wherein the first user input is generated by the passenger pressing a first button of a set of buttons a first time.

3. The method of claim 2, wherein the first announcement indicates that the passenger can cancel the request by pressing the first button a second time.

4. The method of claim 3, wherein the first announcement further indicates that the vehicle is looking for the second location to pull over.

5. The method of claim 2, wherein the vehicle pulls over at the second location when the first button is not pressed a second time before the vehicle reaches the second location.

6. The method of claim 2, further comprising:
while the vehicle is transporting the passenger to the second location, receiving, by the one or more processors, a second user input from the passenger requesting that the pull over request be cancelled.

7. The method of claim 6, wherein the second user input is generated by the passenger pressing the first button a second time.

8. The method of claim 7, further comprising:
in response to receiving the second user input, controlling, by the one or more processors, the vehicle to transport the passenger to the first location without pulling over at the second location.

9. The method of claim 7, further comprising:
in response to receiving the second user input, playing, by one or more processors, a second announcement through the speaker of the vehicle confirming that the pull over request has been cancelled.

10. The method of claim 1, wherein the first user input is provided via a touchscreen or a microphone.

11. A vehicle configured to operate in an autonomous mode, the vehicle comprising:
a user input device;
at least one speaker; and
one or more processors coupled to the user input device and the speaker, wherein the one or more processor are configured to:
control the vehicle to pick up a passenger and transport the passenger towards a first location;
while the vehicle is transporting the passenger towards the first location, receive a first user input from the user input device requesting that the vehicle pull over before the vehicle reaches the first location; and
in response to receiving the first user input:
play a first announcement through the at least one speaker confirming that a request for the pull over has been made;
look for a second location to pull over; and
control the vehicle to pull over at the second location.

12. The vehicle of claim 11, wherein the first user input is generated by the passenger pressing a first button of a set of buttons a first time.

13. The vehicle of claim 12, wherein the first announcement indicates that the passenger can cancel the request by pressing the first button a second time.

14. The vehicle of claim 13, wherein the first announcement further indicates that the vehicle is looking for the second location to pull over.

15. The vehicle of claim 12, wherein the vehicle pulls over at the second location when the first button is not pressed a second time before the vehicle reaches the second location.

16. The vehicle of claim 12, further comprising:
while the vehicle is transporting the passenger to the second location, receive a second user input from the user input device requesting that the pull over request be cancelled.

17. The vehicle of claim 16, wherein the second user input from the user input device is generated by the passenger pressing the first button a second time.

18. The vehicle of claim 17, further comprising:
in response to receiving the second user input, control the vehicle to transport the passenger to the first location without pulling over at the second location.

19. The vehicle of claim 17, further comprising:
in response to receiving the second user input, play a second announcement through the at least one speaker confirming that the pull over request has been cancelled.

20. The vehicle of claim 11, wherein the user input device is a touchscreen or a microphone.

* * * * *